(12) United States Patent
Jung (10) Patent No.: US 7,414,782 B2
(45) Date of Patent: Aug. 19, 2008

(54) POLARIZED STEREOSCOPIC DISPLAY APPARATUS AND MANUFACTURING METHOD THEREOF

(75) Inventor: Jin Hee Jung, Anyang-shi (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 10/024,222

(22) Filed: Dec. 21, 2001

(65) Prior Publication Data

US 2002/0085280 A1 Jul. 4, 2002

(30) Foreign Application Priority Data

Dec. 30, 2000 (KR) .............. 10-2000-0087186

(51) Int. Cl.
*G02B 27/26* (2006.01)
(52) U.S. Cl. .................. 359/465; 348/58
(58) Field of Classification Search ........ 359/462, 359/464, 465; 348/57, 58; 349/15
See application file for complete search history.

(56) References Cited

U.S. PATENT DOCUMENTS

| | | | | |
|---|---|---|---|---|
| 5,734,416 | A * | 3/1998 | Ito et al. ................ | 345/58 |
| 6,046,787 | A * | 4/2000 | Nishiguchi ............. | 349/129 |
| 6,046,849 | A * | 4/2000 | Moseley et al. ........ | 359/465 |
| 6,055,103 | A * | 4/2000 | Woodgate et al. ...... | 359/494 |
| 6,368,760 | B1 * | 4/2002 | Nishiguchi ............. | 430/20 |
| 6,433,853 | B1 * | 8/2002 | Kameyama et al. ..... | 349/176 |
| 6,627,305 | B1 * | 9/2003 | Deane et al. ............ | 428/304.4 |

FOREIGN PATENT DOCUMENTS

EP   477882 A2 *  4/1992

OTHER PUBLICATIONS

Classification of Polarization [online], http://hyperphysics.phy-astr.gsu.edu/hbase/phyopt/polclas.html,[retrieved Oct. 27, 2000], Retrieved from web.archive.org, <URL http://web.archive.org/web/>.*

* cited by examiner

*Primary Examiner*—Stephone B. Allen
*Assistant Examiner*—Lee Fineman
(74) *Attorney, Agent, or Firm*—McKenna, Long & Aldridge LLP

(57) ABSTRACT

A polarization stereoscopic display device and a method of its manufacture. A liquid crystal display panel displays an information in accordance with signal data comprised of left-eye and right-eye image information, a polarizer polarizes modulated light through polarizer. A patterned retarder layer separates light by polarization into a left-eye picture and a right-eye picture in accordance with its pattern. A light waveguide disposed between the polarizer and the retarder layer reduces polarization changes between the polarizer and the retarder layer. Beneficially, the polarizer, waveguide, and retarder layer are formed into an integral unit. The retarder layer includes a chiral material, and a waveguide layer for the substrate is beneficially comprised of a solvent-proof polymer.

10 Claims, 11 Drawing Sheets

POLARIZER LAYER UNIT

POLARIZED STEREOSCOPIC DISPLAY APPARATUS AND MANUFACTURING METHOD THEREOF

This application claims the benefit of Korean Patent Application No. 2000-87186, filed on Dec. 30, 2000, which is hereby incorporated by reference for all purposes as if fully set forth herein.

BACKGROUND OF THE INVENTION

1. Field of the Invention

This invention relates to a stereoscopic image display device that enables an observer to view a stereoscopic image using polarizing glasses.

2. Description of the Related Art

A conventional stereoscopic image display using a stereoscopic eyeglass provides a picture which can be viewed by an observer's right eye, hereinafter referred to as a "right-eye picture," and a picture which can be viewed by an observer's left eye, hereinafter referred to as a "left-eye picture." Such picture information is viewed through the stereoscopic eyeglass. The observer's brain then processes the left-eye and right-eye picture into a three-dimensional image.

Figure 1:
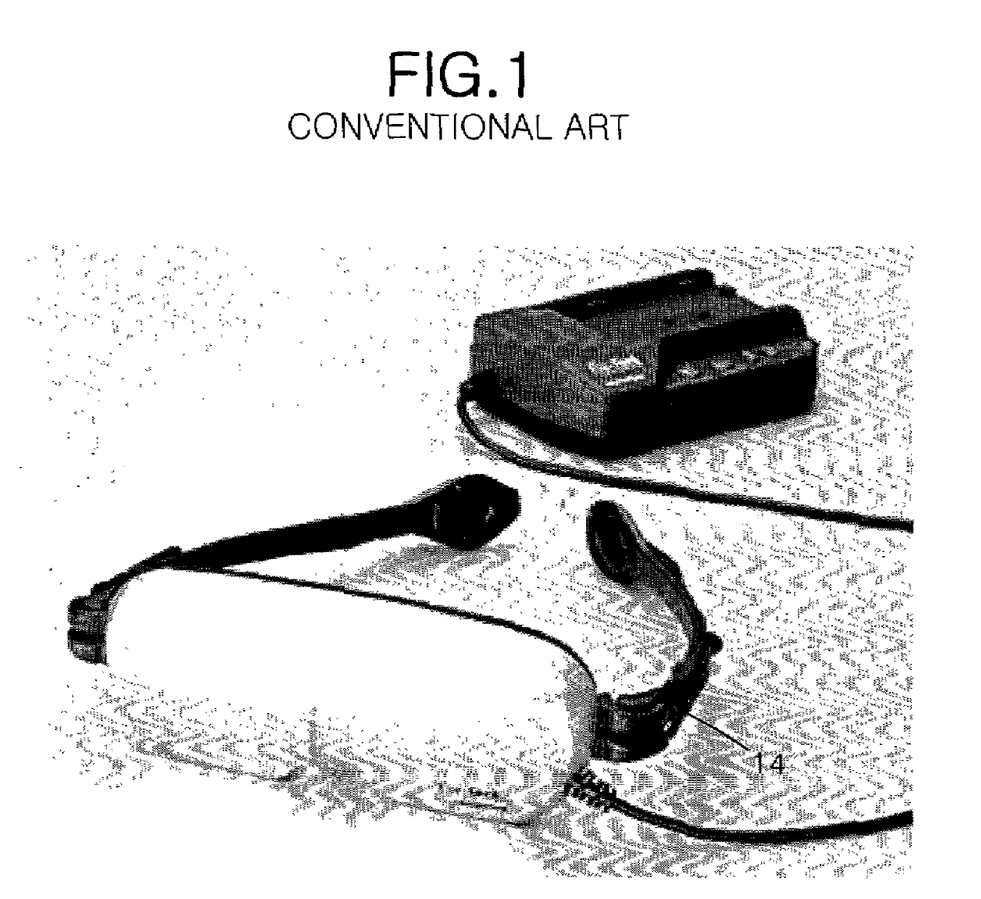
FIG. 1 is a schematic view of a head mounted system of a conventional stereoscopic image display device.

Such stereoscopic image systems include head mounted displays and stereoscopic screen displays. In a typical head mounted display, as shown in FIG. 1, a left-eye picture display and a right-eye picture display are installed in an eyeglass frame 14, respectively.

Figure 2:
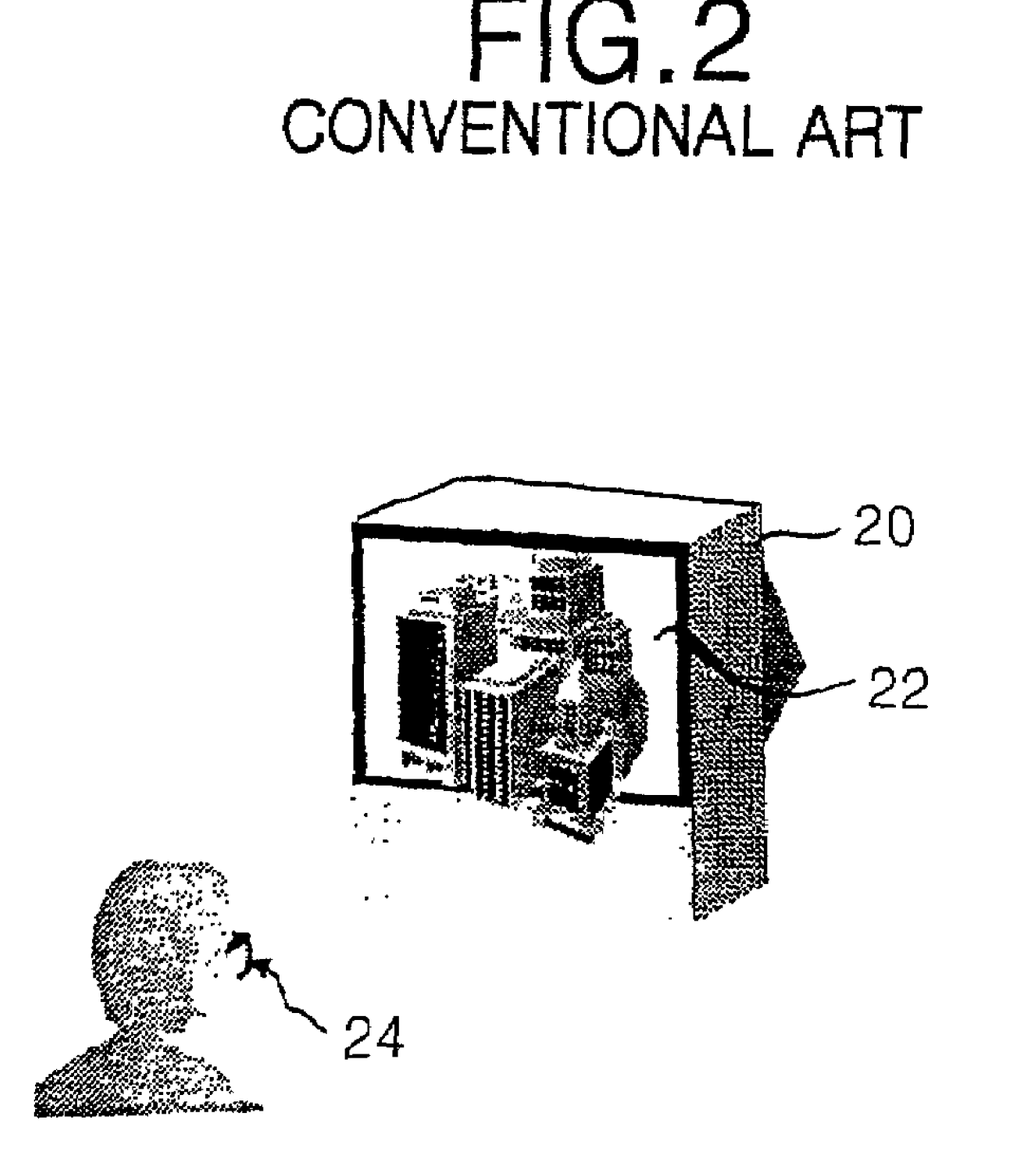
FIG. 2 is a schematic view of a stereoscopic screen system of a conventional stereoscopic image display device.

In a typical stereoscopic screen display, as shown in FIG. 2, a left-eye picture and a right-eye picture are simultaneously or alternately displayed on a stereoscopic screen 22 of a picture display unit 20. Those pictures are then are projected onto an observer's eye through a stereoscopic eyeglass 24.

Figure 3A:
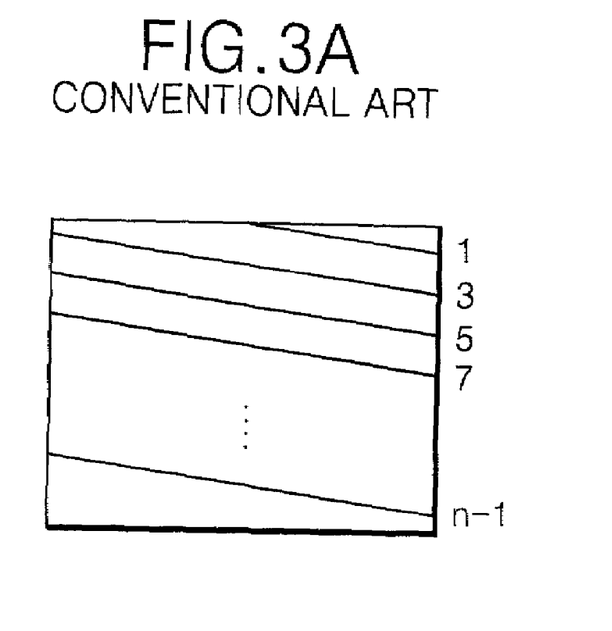
FIG. 3 illustrates an interlace scanning.
Figure 3B:
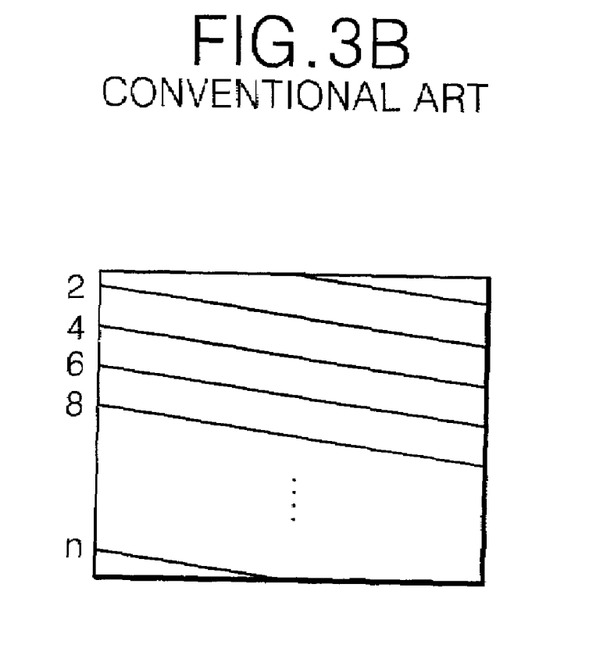
Figure 4:
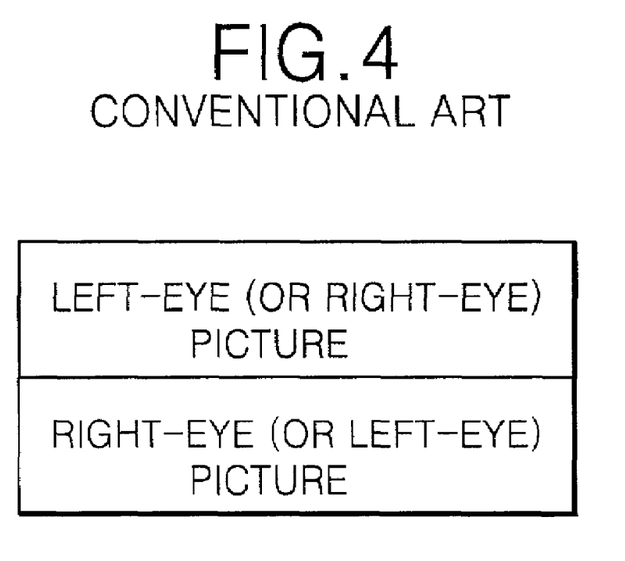
FIG. 4 illustrates an up and down division scanning.
Figure 5:
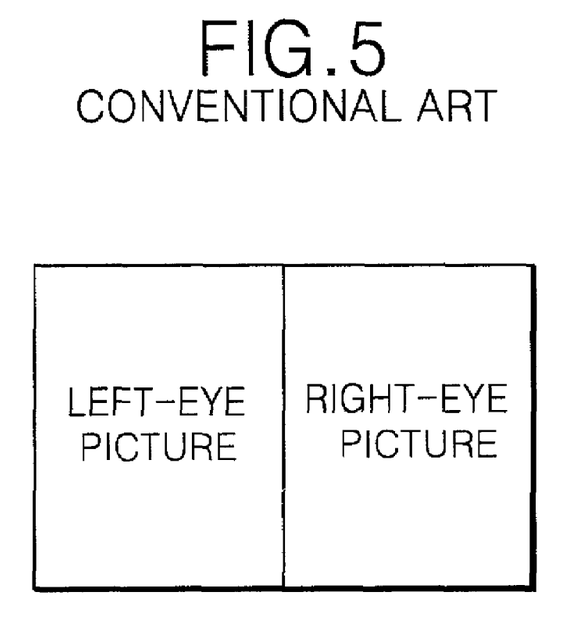
FIG. 5 illustrates a left and right division scanning.

A picture display unit 20 can display left-eye and right-eye pictures using an interlace scanning system, an up and down division system, or a left and right division system. For example, one interlace scanning system displays the left-eye picture during odd-numbered scanning lines, as shown in FIG. 3A, while displaying the right-eye picture during even-numbered scanning lines, as shown in FIG. 3B. An up and down division system can display the right-eye picture on the upper half of the screen 22 and the left-eye picture on the bottom half, as shown in FIG. 4. A left and right system can display the left-eye picture on the left half of the screen 22 while displaying the right-eye picture at the right half, as shown in FIG. 5.

Systems that provide each eye with picture information can also classified into shutter glass systems and polarizing glass systems. In the shutter glass system the left-eye and right-eye pictures that are displayed on the screen are alternately selected by a shutter glass. An observer recognizes the left-eye and right-eye pictures through the shutter glass, combines them mentally, and perceives a three dimensional image.

However, the stereoscopic shutter glass system has a relatively high cost because of the shutter glass. Another disadvantage is the direct exposure of an observer to electromagnetic waves from the shutter glass. The stereoscopic polarized glass system can overcome both of these problems.

Figure 6:
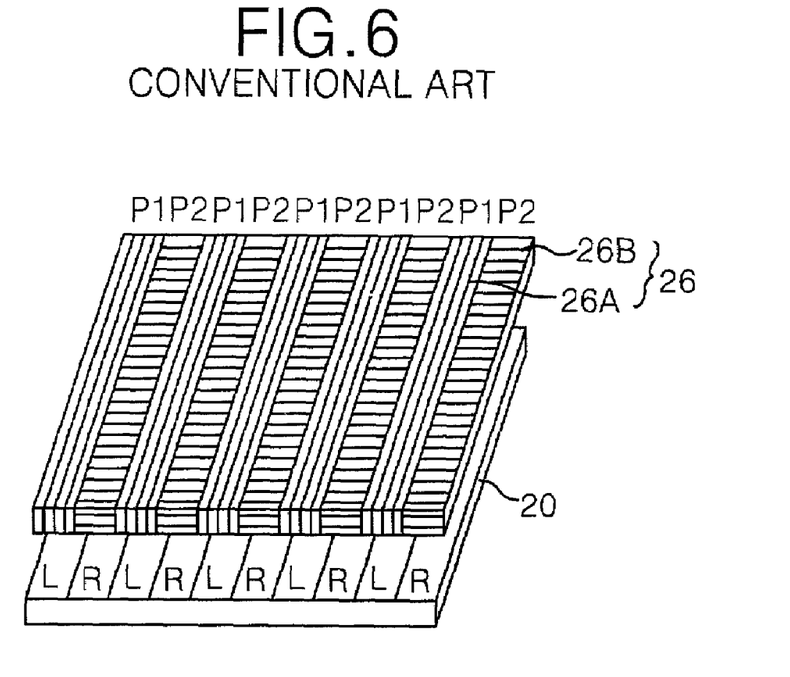
FIG. 6 is a schematic perspective view of a conventional stereoscopic image display device of a polarizing glass system.
Figure 7:
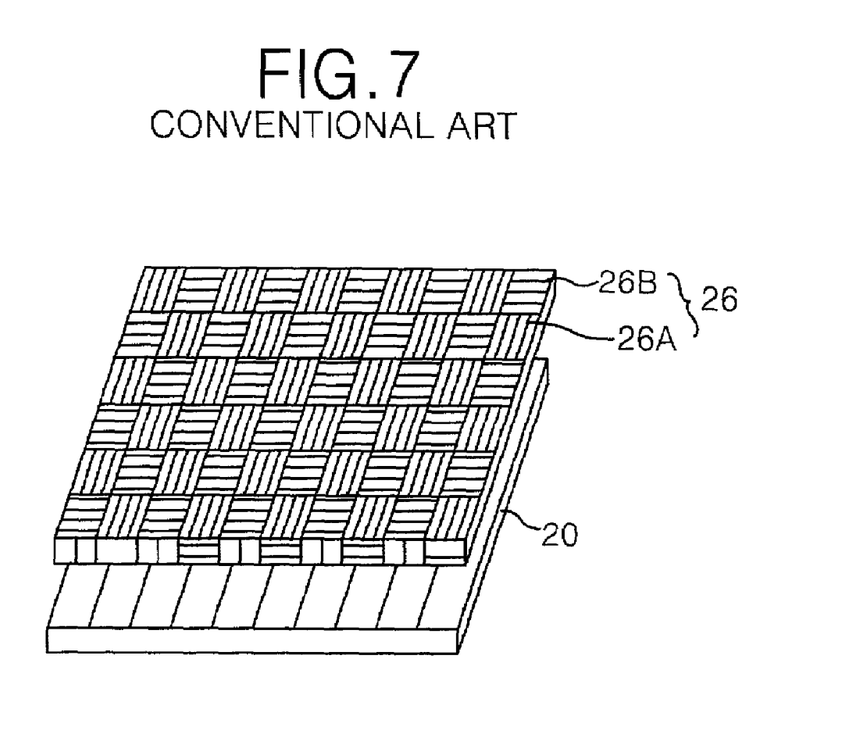
FIG. 7 illustrates an alternative patterned polarizer of FIG. 6.

The stereoscopic polarized glass system allows the left-eye and right-eye pictures on a screen to be directed to an observer's left eye and right eye, respectively, via a polarizing glass. As shown in FIG. 6, a conventional stereoscopic display device that uses a polarizing glass system includes a patterned polarizer 26 on the picture display unit 20. The left-eye and right-eye pictures are imaged on the picture display unit in a striped or checkered display pattern. Those images pass through the polarizer 26, which is patterned the same as the display pattern. For example, FIG. 6 shows the polarizer 26 with lines of a set of first micro cells 26A and of a set of second micro cells 26B. The first set and the second micro cells have different polarizations. FIG. 7 shows first and second micro cells 26A and 26B arranged in a checkered pattern. Accordingly, the left-eye picture and the right-eye picture pass through the polarizer 26 with different polarizations. The left-eye and right-eye pictures are then applied to each eye of an observer through polarizing lens of an eyeglass, which pass only the proper component to each eye. An observer then perceives a three dimensional image.

While generally successful, the micro cell patterns 26A and 26B are usually produced from a poly organic material by fabrication processes that include at least a photoresist step, an etching step, and a stripping step. As a result, stereoscopic image display devices that use the polarizing glass system have problems in that it is difficult to obtain a high quality polarization at low cost.

SUMMARY OF THE INVENTION

Accordingly, it is an object of the present invention to provide a polarized stereoscopic image display apparatus, and a manufacturing method thereof, having a high quality polarization and that can be produced at low cost.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other objects of the invention, a polarized stereoscopic display apparatus according to one aspect of the present invention includes a liquid crystal display panel for producing modulated light in accordance with signal data; a polarizer for polarizing modulated light from the liquid crystal display panel; and a patterned retarder layer, provided on the polarizer, for producing left-eye picture and right-eye picture images, and a polarizing glass for receiving each different polarization, respectively.

In the polarized stereoscopic display apparatus, the retarder layer is beneficially formed on a transparent substrate of a solvent-proof polymer. The transparent substrate prevents changes in the polarization of the modulated light from the polarizer. The retarder layer is made from liquid crystal (LC) mixtures that includes chiral materials. Chiral materials properties are charged by light. The LC mixture which contains this photo-changeable chiral material, hereinafter referred to as a "chiral mixture." The chiral mixture is exposed to light through a photo-mask. Then the light-exposed part and light-unexposed part have different chiralities and the polymerization process is followed. The polarization of light that pass through LCD is changed by passing through one pattern of retarder and is remained by passing through the other pattern of retarder. The first and second cell areas are arranged in alternating lines, alternatively, the first and second cell areas are arranged in a checkered pattern.

A polarized stereoscopic display apparatus according to another aspect of the present invention includes a structure comprising a polarizer and a retarder layer on a transparent substrate made of a wave guide material. The structure is for polarizing incoming light and then separating that light into left-eye picture and right-eye picture information. Beneficially, the transparent substrate made of wave guide material provided and retarder layer on the transparent substrate is attached to the polarizer by an adhesive.

In the polarized stereoscopic display apparatus, the transparent substrate made of wave guide material beneficially contains a solvent-proof polymer. The retarder layer contains a chiral dopant that permits light modulation. The retarder layer is partially exposed to light so as to be divided into a plurality of first cell polarization areas for transmitting light for the left-eye picture and a plurality of second cell polarization areas for transmitting light for the right-eye picture. The first and second cell polarization areas are arranged in alternately line by line. Additionally, the first and second cell polarization areas can be arranged in a checkered pattern.

A method of manufacturing a polarized stereoscopic display device according to another aspect of the present invention includes the steps of preparing both a polarizer and a transparent substrate made of a wave guide material having a retarder layer, exposing the retarder layer which has two kinds of optical layer to form cells, modulating the polarization of light for separately passing left-eye picture and right-eye picture images, and adhering the transparent substrate, and the retarder film to the polarizer using an adhesive.

BRIEF DESCRIPTION OF THE DRAWINGS

These and other objects of the invention will be apparent from the following detailed description of the embodiments of the present invention with reference to the accompanying drawings, in which:

FIG. 9A to FIG. 9C illustrate a method of manufacturing the polarized stereoscopic display device shown in FIG. 8;

FIG. 11A to FIG. 11D illustrate a method of manufacturing the polarized stereoscopic display device shown in FIG. 10.

DETAILED DESCRIPTION OF ILLUSTRATED EMBODIMENTS

Figure 8:
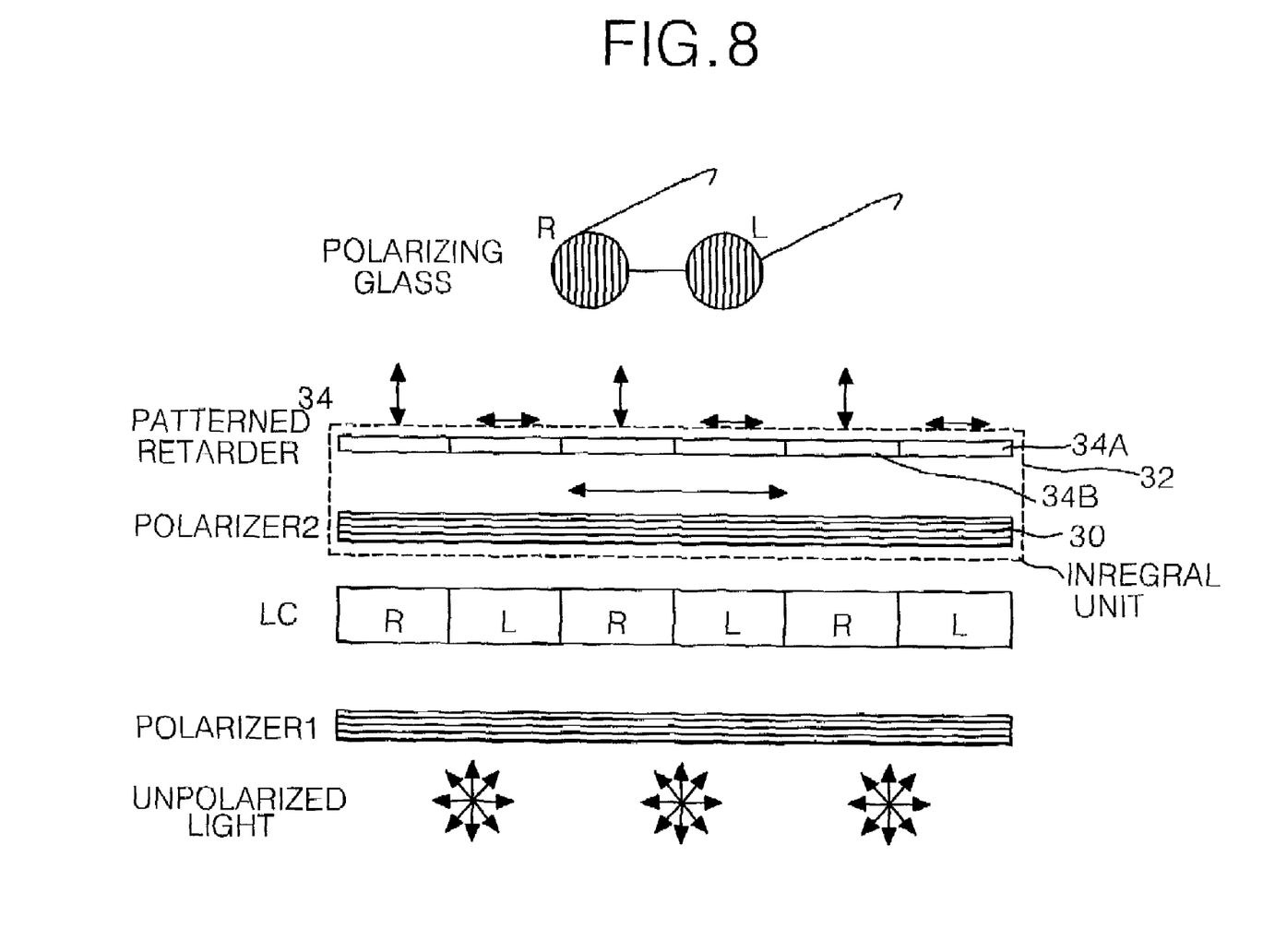
FIG. 8 is a schematic perspective view of a polarized stereoscopic display device according to an embodiment of the present invention.

Referring to FIG. 8, there is shown a polarized stereoscopic display device according to an embodiment of the present invention. The polarized stereoscopic display device of FIG. 8 includes a transparent substrate 32 made of a wave guide material and a retarder layer 34 on transparent substrate 32 which does not affect polarization. Those layers are on a polarizer 30. The retarder layer 34 modulates polarized light transmitted through the polarizer 30 such that light for a left-eye picture and light for a right-eye picture are separated into different polarizations. The transparent substrate 32 is beneficially made from a solvent-proof polymer.

The retarder layer 34 includes a plurality of first polarizing cell areas 34A and a plurality of second polarizing cell areas 34B that have different light polarization. For example, as shown in FIG. 8, the light emitting from the first polarizing cell areas 34A is linearly polarized and the polarization direction of it is substantially perpendicular to the polarization direction of the light emitting from the second polarizing cell areas 34B. The first and second polarizing cell areas 34A and 34B, respectively, are arranged in alternating lines. Otherwise, the first and second polarizing cell areas 34A and 34B may be arranged in such a manner as to be alternated in all of the vertical and horizontal directions.

The retarder layer 34 on the transparent substrate 32, beneficially, form an integral assembly with the polarizer 30. This enables all of those parts to be installed in one step. Accordingly, in a polarized stereoscopic display device according to an embodiment of the present invention, a light-modulating layer can be formed by one coating and one light irradiation patterning and one light irradiation polymerization. This simplifies the manufacturing process and reduces cost.

Below the polarizer 30 is a liquid crystal display panel, which includes a second polarizer and a back light (not shown). The second polarizer converts light from the back light into polarized light. The liquid crystal display panel then modulates the polarized light from the second polarizer in accordance with signal data. That signal data includes information for both a left-eye picture and a right-eye picture.

Figure 9A:
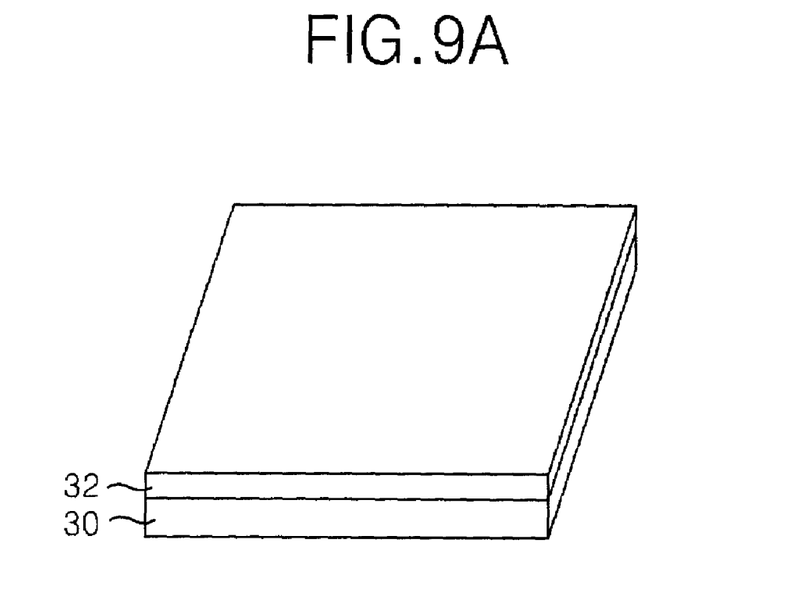
Figure 9B:
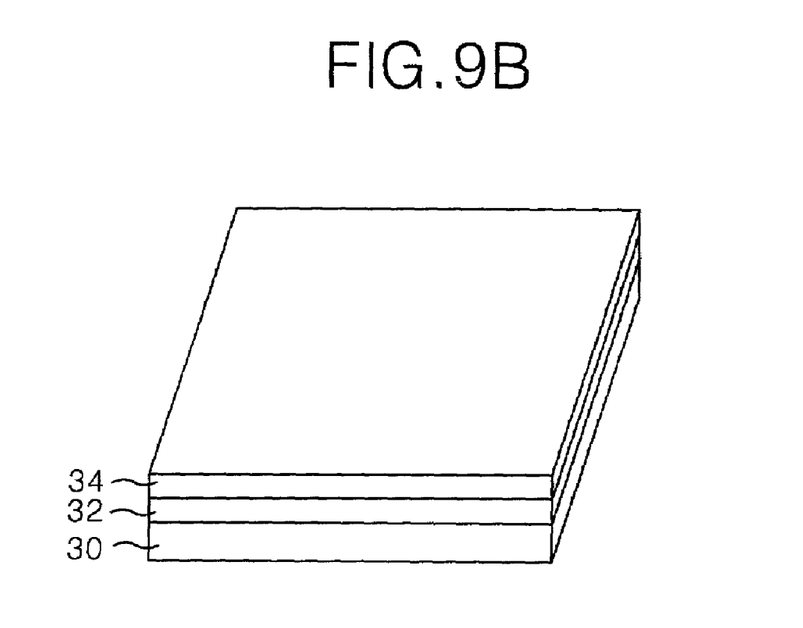
Figure 9C:
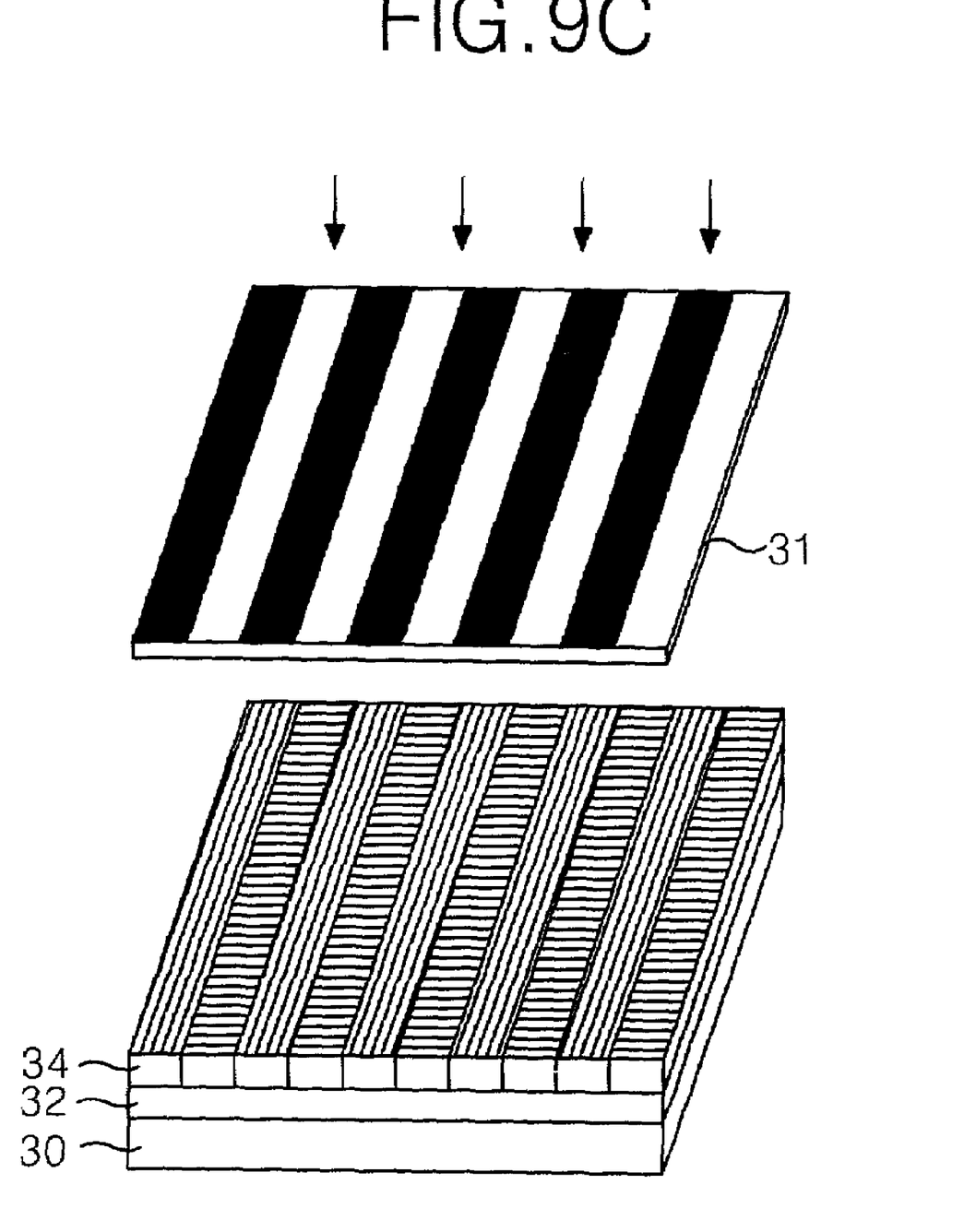

FIGS. 9A to FIG. 9C illustrate a method of manufacturing the polarized stereoscopic display device shown in FIG. 8. Referring now to FIG. 9A, the transparent substrate 32 made of wave guide material, formed on the polarizer 30 includes a solvent-proof polymer on a surface of the polarizer 30.

Referring now to FIG. 9B, the retarder layer 34 is then formed on the transparent substrate 32 made of wave guide material layer. The retarder layer 34 is comprised of a material containing a chiral dopant that can be light modulated or can be changed in its chiral property by light. As shown in FIG. 9C, the retarder layer 34 is then partially exposed to light through a mask 31. The retarder layer is then comprised of a portion having chiral characteristics modulated by the light passed through the mask 31 and a portion having an unmodulated chiral characteristic. The various portions then form first and second polarizing cell areas 34A and 34B that alternate line by line. Alternatively, the retarder layer 34 may be patterned in a checkered fashion as shown in FIG. 10.

Figure 10:
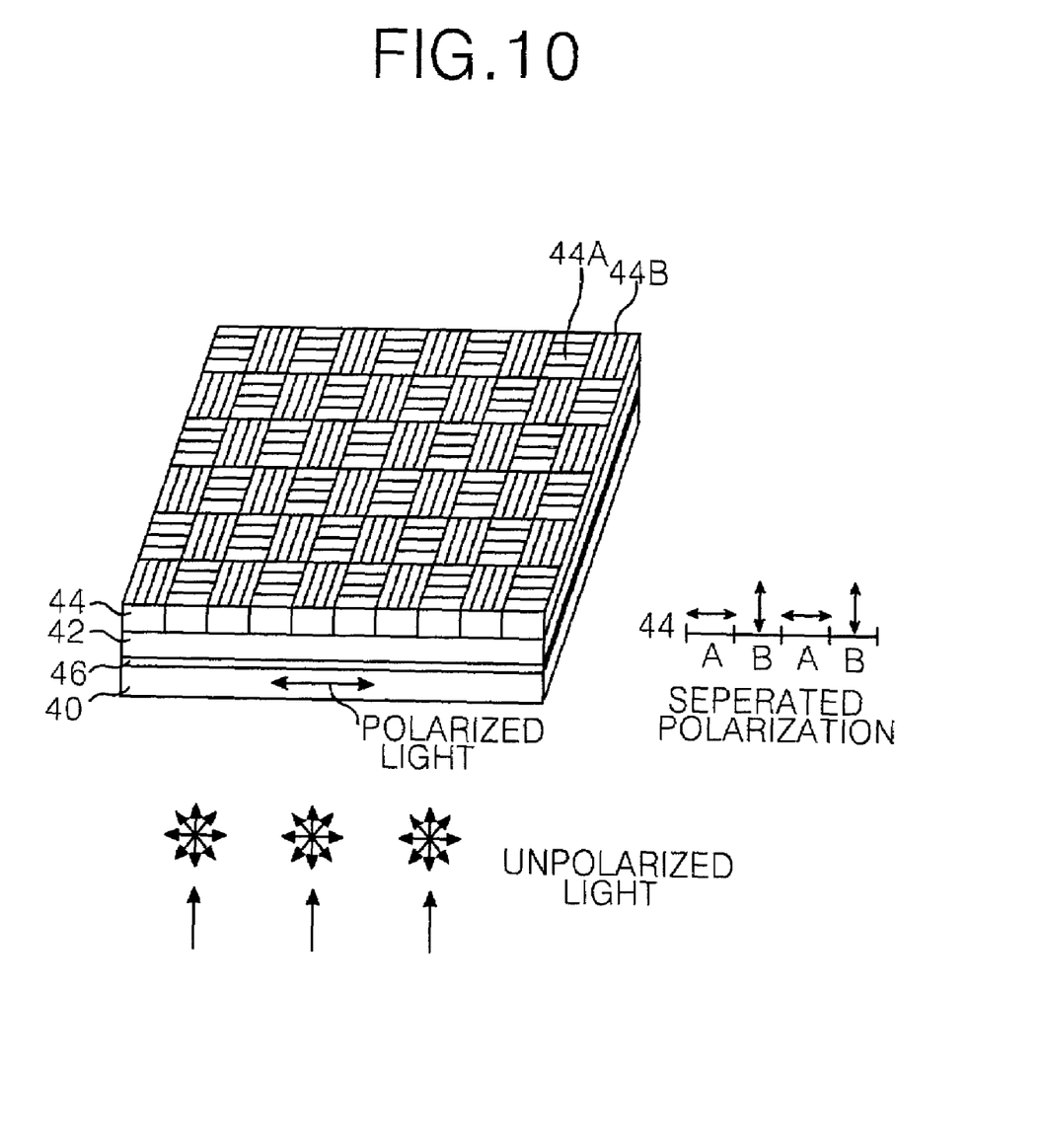
FIG. 10 is a schematic perspective view of a polarized stereoscopic display device according to another embodiment of the present invention.

Referring now to FIG. 10, there is shown integral polarizing unit for a polarized stereoscopic display device according to another embodiment of the present invention. The polarized stereoscopic screen of FIG. 10 includes a transparent substrate 42 made of wave guide material that adheres to one side of a polarizer 40 via an adhesive layer 46. The transparent substrate 42 is beneficially made from a solvent-proof polymer. The other surface of the transparent substrate 42 is provided with a patterned retarder layer 44.

In operation, polarized light passes through the polarizer 40 to the retarder layer 44. The retarder layer 44 separates light from the polarizer 40 in accordance with the light-modulation characteristics of the retarder layer 44, thereby separating the polarized light into a left-eye picture and a right-eye picture. To this end, the retarder layer 44 includes a plurality of first polarizing cell areas 44A and a plurality of second polarizing cell areas 44B having a different polarization. The first and second polarizing cell areas 44A and 44B are arranged in a checkered fashion. Alternatively, the first and second polarizing cell areas 44A and 44B may be arranged so as to alternate line by line as shown in FIG. 9.

As described above, the retarder layer 44 on the transparent substrate 42 are formed integral to the polarizer 40 such that they can be mounted onto a liquid crystal display screen in one step. Accordingly, a polarized stereoscopic display device according to the present invention is capable of high quality and reduced cost.

FIG. 11A to FIG. 11D explain a method of manufacturing the polarized stereoscopic display device shown in FIG. 10.

Figure 11A:
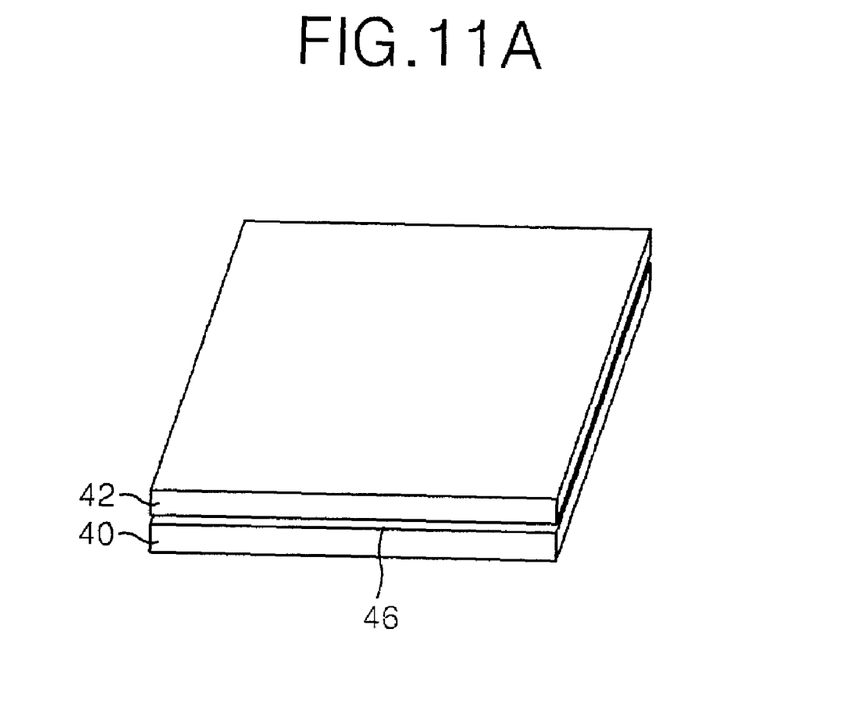
Figure 11B:
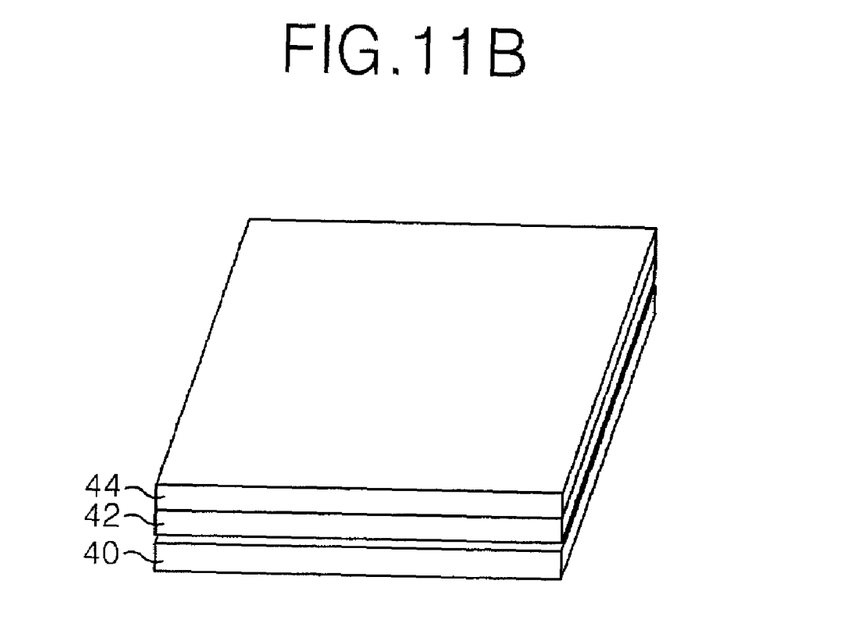
Figure 11C:
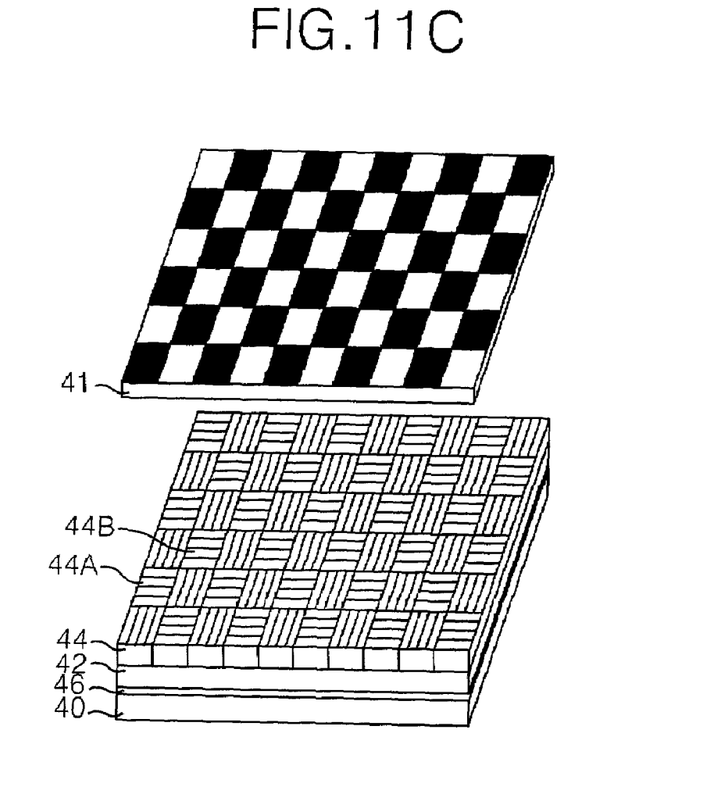
Figure 11D:
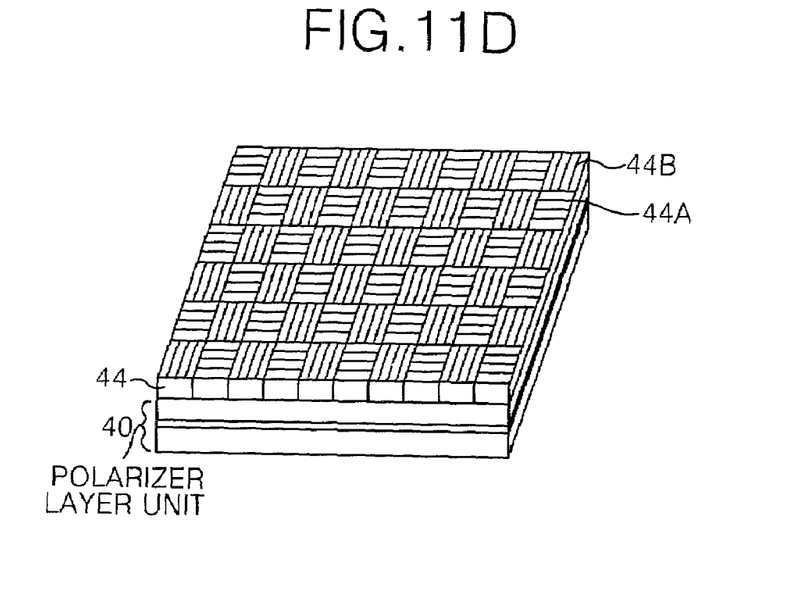

Referring now to FIG. 11A, the transparent substrate 42 made of a wave guide material which also includes a solvent-proof polymer, is adhered to the polarizer 40 using an adhesive layer 46. Then, as shown in FIG. 11B, a material containing a concentration of chiral dopant having a defined pitch is formed on the transparent substrate 42 to form a retarder layer 44. Referring now to FIG. 11C, the retarder layer 44 is then partially exposed to a light through a mask 41. Then, as shown in FIG. 11D the partial exposure forms a plurality of first and second polarizing cell areas 44A and 44B in a checkered patterns. Alternatively, the retarder layer 44 may be patterned such that the plurality of first and second polarizing cell areas 44A and 44B alternate line by line.

Another manufacturing approach is to form the wave guide material substrate 42 and the retarder layer 44 on the polarizer unit 40, directly as shown in FIG. 11D.

As described above, according to the principles of the present invention, the retarder layer is beneficially formed integral with the polarizer such that the integral unit can be installed on a panel of a picture display device in one step. Accordingly, it is possible to provide a high quality three dimensional picture at low manufacturing cost. Furthermore, it becomes possible to simplify a manufacturing process.

Although the present invention has been explained by the embodiments illustrated above, it should be understood that the invention is not limited to those embodiments, but rather that various changes or modifications thereof are possible without departing from the spirit of the invention. Accordingly, the scope of the invention shall be determined only by the appended claims and their equivalents.

What is claimed is:

1. A method for fabricating a stereoscopic display device, comprising:

preparing a display panel having first and second pixels for displaying left-eye and right-eye image information, respectively; and forming a structure including a polarizer, a transparent substrate and a retardation layer, including the steps of:

forming the polarizer; forming an adhesive layer on the polarizer; forming the transparent substrate on the adhesive layer; and forming the retardation layer on the transparent substrate without an alignment layer between the retardation layer and the transparent substrate, the retardation layer including a chiral dopant with a predetermined pitch and the transparent substrate different from substrates of the display panel;

forming first and second polarizing cell areas in the retardation layer corresponding to the first and second pixels over the display panel by a single light irradiation process through a mask; and mounting the structure to the prepared display panel.

2. The method according to claim 1, further comprising polymerizing the retardation layer by irradiating a light.

3. The method according to claim 2, wherein the first and second polarizing cell areas are arranged in alternating lines.

4. The method according to claim 2, wherein the first and second polarizing cell areas are arranged in a checkered pattern.

5. The method according to claim 2, wherein the retardation layer is covered with a protecting polymer.

6. The method according to claim 1, wherein the display panel is a liquid crystal display (LCD) panel.

7. The method according to claim 1, wherein the transparent substrate includes a solvent-proof polymer.

8. The method according to claim 1, wherein forming the retardation layer having first and second polarizing cell areas does not include removing a portion of the retardation layer.

9. The method according to claim 1, wherein the transparent substrate is formed between the polarizer and the retardation layer.

10. The method according to claim 1, wherein the polarizer is mounted between the transparent substrate and the display panel.

* * * * *